United States Patent
McHugh

[15] 3,704,019
[45] Nov. 28, 1972

[54] SPIRAL GROOVE FACE SEALS
[72] Inventor: James D. McHugh, San Jose, Calif.
[73] Assignee: General Electric Company
[22] Filed: June 19, 1970
[21] Appl. No.: 47,824

[52] U.S. Cl.....................277/27, 277/96 A, 277/89
[51] Int. Cl. ..........................F16j 15/16, F16j 15/40
[58] Field of Search............277/96, 27, 25, 74, 93, 3, 277/88, 133, 89

[56] References Cited
UNITED STATES PATENTS

| | | | |
|---|---|---|---|
| 3,499,653 | 3/1970 | Gardner | 277/96 X |
| 3,527,465 | 9/1970 | Guinard | 277/96 X |
| 3,093,382 | 6/1963 | Macks | 277/74 X |
| 2,995,391 | 8/1961 | Snyder | 277/93 X |

*Primary Examiner*—Samuel B. Rothberg
*Attorney*—John J. Kissane, James C. Davis, Jr., Frank L. Neuhauser, Oscar B. Waddell and Joseph B. Forman

[57] ABSTRACT

A seal for a rotating shaft which extends between areas containing fluids at different pressures. A spring-biased sealing ring rotates with the shaft and is axially biased against a stationary runner having deep, helical grooves thereon. Fluid from the side of the runner with which the grooves communicate is forced beneath the ring and provides a countervailing pressure against the fluid on the other side of the runner.

8 Claims, 5 Drawing Figures

PATENTED NOV 28 1972  3,704,019

INVENTOR.
JAMES D. McHUGH
BY
John J. Kissen
HIS ATTORNEY

SPIRAL GROOVE FACE SEALS

BACKGROUND OF THE INVENTION

The present invention relates to shaft seals, and more particularly to sealing means which establish pressure within the seal assembly.

In providing driving means extending from an enclosure into a body of fluid, it is necessary to provide a seal for preventing the driven fluid from flowing along a shaft of the driving means and into the enclosure. In particular, where electric motors are to be submerged in water, as in the case of a submersible pump, it is necessary to prevent the water from entering the motor. This is commonly done by filling the motor with oil or other dielectric fluid, and pressurizing the fluid.

The pressurization is achieved by filling a resilient chamber, which may be a rubber bag, with oil and applying pressure thereto by means of a compressed coil spring.

Sealing means are then provided about the motor shaft to prevent the entry of water, and corresponding loss of oil. One type of sealing means comprises a ring located about a shaft and constrained to rotate with the shaft. The ring contacts a stationary runner which is disposed about an opening through which the shaft passes. Sealing is accomplished by forcing one face of the ring against the runner, some of the pressurized oil finding its way between the surfaces and enhancing the seal. Despite oil pressures which are substantially above the outside water pressure, it has been found that water will often traverse the gap between the ring and the runner and mix with the oil. In the past, one approach to this problem has been to increase the pressure of the spring which biases the ring against the runner. Unfortunately, this can be done only at the expense of increased friction and wear at the interface between the ring and runner. Another approach which may be taken is to further increase the pressure of the dielectric fluid within the motor. However, this would require an oil reservoir which was much stronger but still resilient. A stronger pressurizing spring would also be needed to pressurize the reservoir. These changes would necessitate strengthening the entire motor casing to sustain the additional hydrostatic pressure although the additional pressure is required only about the seal itself. A further approach has been to provide a pair of seals along the motor shaft, the dielectric fluid which is disposed between the seals being pressurized to a degree exceeding that of the fluid within the motor proper. However, this method generally requires auxiliary pumping means in addition to the extra seal. In addition, the motor housing is necessarily lengthened.

One approach taken in the prior sealing art was to adapt a thrust bearing having a helically-grooved face for use as a sealing element. Such grooves, hereinafter termed "viscosity grooves" are known in the prior art and use the relative motion between the ring and runner to pump viscous fluid into the grooves and thence into the gap between the ring and runner. The pressure created thereby in the gap increases the thickness of the fluid film, and thus of the gap, forcing more of the dielectric fluid outward through the gap. However, when a limited reservoir of dielectric fluid is available, as in the case of a submersible motor, the system cannot sustain such a large outflow of fluid.

In one prior art device an annular runner is provided with two sets of helical grooves, a first set communicating with the outer periphery, and the second set communicating with the inner periphery thereof, so as to present a "herringbone" appearance. A narrow, ungrooved area, or "land" is provided between the two sets of grooves. One set of the grooves communicates with a first fluid, while the other set communicates with a second fluid. Motion of a ring on the runner surfaces causes both fluids to be drawn into the grooves, producing a pressure at the land between the grooves which is higher than the pressure of either fluid. However, in the case of a sealing means for preventing the intermixture of two viscous fluids such as oil and water, it is undesirable to raise both fluids to a high pressure beneath the seal face, since it is preferred that the oil pressure predominate; further, as will be described herein, pressurizing both fluids does not overcome the inpumping action of the seal.

SUMMARY OF THE INVENTION

The present invention contemplates the provision of a single set of deep, helical viscosity grooves in the face of an annular sealing ring or runner. The grooves extend from either the inner or the outer periphery of the element, depending on which periphery is in contact with the internal, sealing fluid and extend to a point intermediate the inner and outer periphery so as to leave an ungrooved, annular land upon the face of the element. However, while viscosity grooves, as have heretofore been known, provide a pumping action which raises the pressure in the gap between the mating ring and runner and cause a significant volume of fluid to be pumped out through the resulting gap, the subject invention contemplates the use of grooves which are of an order of 100 times as deep as those heretofore used. The grooves provide sufficient pressure to the ring-runner interface to prevent the inpumping of the lower-pressure fluid, while avoiding excessive expulsion of the higher pressure, dielectric fluid.

It is therefore an object of the present invention to provide an improved rotating seal.

It is a further object to provide a seal having helical viscosity grooves which do not cause separation of the mating surfaces thereof.

It is a still further object to provide a seal having helical viscosity grooves but which does not pump fluid through the seal at an excessive rate.

DESCRIPTION OF THE PREFERRED EMBODIMENT

Figure 1:
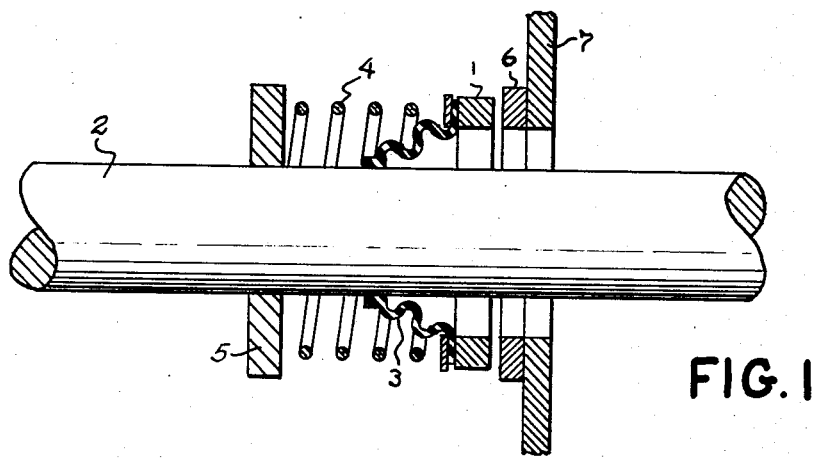
FIG. 1 is a sectional view of a typical shaft and associated seals as taught by the subject invention.

Referring now to FIG. 1, a typical rotating seal assembly, as taught by the invention, is depicted. A sealing ring 1 is attached to rotatable shaft 2 by means of rubber bellows 3. The bellows allows the ring to move along the shaft axis yet provides fluid tight seal therebetween. A coil spring 4 bears against retainer 5 to bias the sealing ring against an annular runner 6 which is fixedly attached to a stationary member 7 which may, for instance, be an end shield of an electric motor. The rotating ring 1 is made of a substance compatible with the runner, and is usually made from carbon. The runner 6 may be of stainless steel, and have a chromium-plated mating surface; or it may be made of a suitable ceramic material. In the illustrated embodiment, oil retained within the motor casing surrounds the outer periphery of the rotating ring. A fluid in which the motor is immersed, such as water, surrounds the right side of the shaft and contacts the inner peripheries of the ring and runner. It will be seen that the only point at which the two fluids can intermingle is at the interface of the sealing ring and runner. To aid in preventing an inflow of water, the oil is typically pressurized, creating a pressure gradient across the oil film lying between the ring and the runner. In contradistinction to a thrust bearing, wherein it is desirable to provide a thick film of oil between the movable and stationary elements, a very thin film between the sealing ring and runner is desired when such a device is intended to serve as a seal. The oil film and thus the gap between the components if normally desired to be approximately 40 to 50 millionths of an inch thick. The thinness of the gap serves to prevent an undesirably high outflow of oil, which would deplete the oil reservoir.

Despite the higher hydrostatic pressure of the oil, and the thinness of the film due to the loading afforded by spring 4, it has been found that the water will often traverse the gap between the seal elements, against the hydrostatic pressure of the oil, and enter the oil-filled motor. This phenomenon, which may be termed "in-pumping," is thought to be caused by the eccentricity of the sealing ring with respect to the axis of rotation. Such eccentricity is shown, to an exaggerated degree, in FIG. 2 wherein the geometric center $C_1$ of a carbon sealing ring 1 is displaced from the center of rotation $C_7$ of a shaft 2. It will be seen that as the shaft turns, the velocity of point A of sealing ring 1 is not tangent to the sealing ring edge, but perpendicular to a radius extending from the center of rotation of the shaft. The velocity of point A therefore may be considered to have two components; a first, "rotational" component indicated as $V_R$, which is tangent to the sealing ring at point A, and a second, "transverse" component $V_T$ which is perpendicular to the sealing ring at point A. The ring thus not only rotates but also "wipes" the mating surface transversely.

Figure 2:
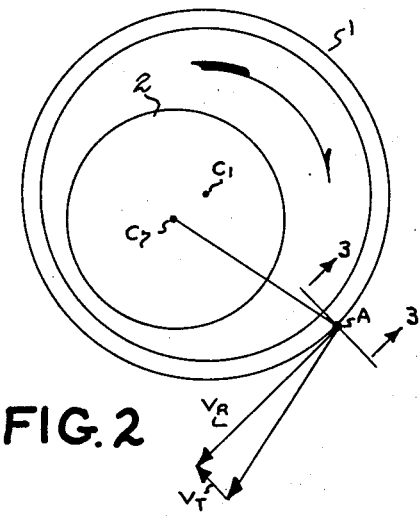
FIG. 2 illustrates the eccentricity between a shaft and associated sealing ring.
Figure 3:
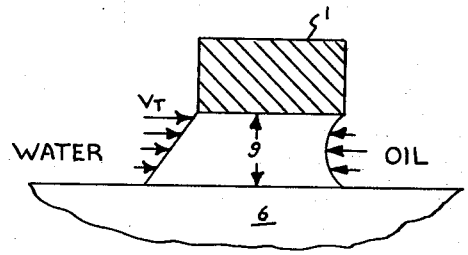
FIG. 3 is an idealized sectional view taken at 3—3 of FIG. 2.

FIG. 3, taken at 3—3 of FIG. 2, is a transverse section of ring 1 at point A. For purposes of illustration, the gap $g$ is much exaggerated. The transverse velocity $V_T$ of ring 1 with respect to underlying stationary runner 6 is apparent, the ring moving from left to right. As the sealing ring moves transversely, it draws the water with it, and forces the oil back. The velocity profile of the water in the gap between the sealing ring and runner varies from zero at the surface of the stationary runner to $V_T$ at the surface of the sealing ring. However, the velocity profile of the oil film, which results almost solely from hydrostatic pressure within the motor housing, is roughly parabolic, the oil having its highest velocity toward the center of the gap and practically zero velocity at the surfaces of both the runner and the sealing ring. It will be understood that while the velocity of the oil is sufficient to overcome that of the inrushing water for that part of the gap which lies toward the stationary runner, the water nearest disposed in that portion of the gap near the ring surface has a much higher velocity than does the oil in the same area. The water thus drives the oil backward along the ring surface, and enters the motor housing.

At the opposite side of the sealing ring the process is reversed, with the oil being pumped outward under the ring surface, eventuating in a decrease of hydrostatic pressure within the motor housing.

It has been found that the pumping action described above occurs even with every minute amounts of seal ring eccentricity. In the the manufacture of large electric motors, it has been found to be virtually impossible to eliminate all such eccentricity. Even if the sealing ring could be made perfectly concentric with the shaft surface, a slight bowing of the shaft, or an out-of-balance condition of the rotor, would cause the center of rotation to be displaced slightly from the geometric center of the shaft, and thus of the ring.

In order to overcome the velocity of the in-pumped water, it is possible to raise the hydrostatic pressure of the oil sufficiently to overcome the inpumping phenomenon. However, to increase the hydrostatic pressure to such a degree would lead to excessive oil loss through the seal gap and would require an excessively large oil pressure spring, necessitating a substantial increase in the strength of the motor housing, resulting in increased weight and cost.

Previous attempts at eliminating inpumping have included increasing the strength of the spring 4 which biases the sealing ring against the runner in an attempt to reduce the separation of the surfaces. However, increasing spring loads cannot reduce the separation to zero without crushing the surfaces. By increasing the pressure of the spring to the degree necessary to produce an acceptably small separation, the contacting surfaces of the sealing ring and runner are prone to extreme wear when the motor first begins to rotate, and the seal is "dry." Increased friction, and heat resulting therefrom, are further problems which would result from such increased spring pressures. All dynamic face seals therefore require a small gap for lubrication of the surfaces.

Figure 4:
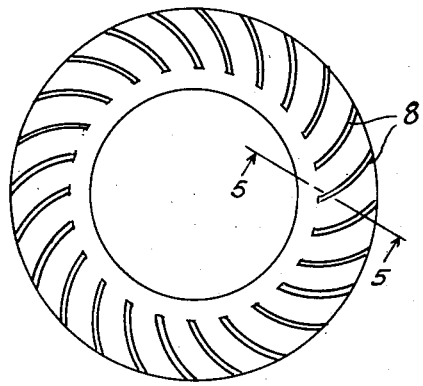
FIG. 4 shows a sealing element having viscosity grooves formed therein.

Referring now to FIG. 4, a seal runner is shown which obviates the need for increased spring or hydrostatic pressures, while providing a sealing function which counteracts the above-described inpumping effect. A mating face of either the runner 6 or the sealing ring 1 is provided with a series of grooves 8. The grooves, extending generally tangentially to the inside diameter of the runner in the manner of a helix, extend from the outer periphery to a point between the outer and inner periphery, the closed ends thereof defining an annular land or ungrooved surface about the inner diameter of the runner. As the mating members rotate against one another, oil is drawn into the grooves by virtue of the relative rotation of the members. The shearing effect at the interface creates a hydrostatic pressure within the grooves, which adds to the pressure of the oil within the gap between the runner and sealing ring caused by the hydrostatic pressure within the motor housing.

While helically-grooved thrust bearings are known, bearings of this type as taught by the prior art are unsuitable for use when limited reserves of the sealing fluid are available, since the pressure generated by the grooves of prior art bearings will cause the sealing ring to lift off the runner, increasing the gap therebetween, and increasing the outflow of oil between the surfaces. While such a response is highly desirable when the device is being used as a bearing, the increased gap is intolerable when the device is to be utilized as a seal. The increased outflow of oil defeats the purpose of the seal, and exhausts the available reserves. In the prior art viscosity groove bearings, the ratio of the depth of the grooves to the width of gap between the sealing ring and the runner is typically two or three to one. Such a groove depth-to-gap ratio increases the load-carrying capacity of the device since the viscous fluid drawn into the grooves creates a hydrostatic pressure which significantly increases the thickness of the lubricating film and forces the mating surfaces to separate.

To lessen the pumping effect of the grooves, and thus diminish pressure causing separation of the surfaces, the grooves may be made shallower. However, according to prior design theory, grooves which will provide the requisite additional pressure in the gap, without unwanted outpumping, are so shallow as to be susceptible to destruction by scoring or wiping should the sealing ring and runner rub together. Further, even with an extremely shallow grooves some separation will still occur when the oil is cold, since the pumping effect caused by such grooves is strongly dependent upon the viscosity of the fluid. When the oil is cold, and highly viscous, a greater quantity will be pumped through the grooves, separating the surfaces and resulting in an undesirably high rate of outpumping.

I have discovered that by making the grooves far deeper than any heretofore used in the relevant seal or bearing art, the necessary additional pressure will be supplied to the gap without the undesirably high outpumping of fluid which accompanies the use of normal, shallow grooves. The pressure thus provided varies with viscosity only to a slight degree and thus will not result in excessive outpumping during "startup" stages of operation, when the fluid is cold.

The term "deep groove" as used herein is meant to designate a viscosity groove in the face of one of two mating, relatively movable members whose depth is greater than that which would be required, for any finite gap, to provide sufficient hydrostatic pressure to counteract a force tending to squeeze the members together. The depth of such a groove is of an order of 100 times greater than those utilized by prior art devices. It must be remembered that while increased gap thickness, and thus oil film thickness, is a desirable quality in a bearing it is extremely detrimental to those qualities which are of the essence in a seal.

Figure 5:
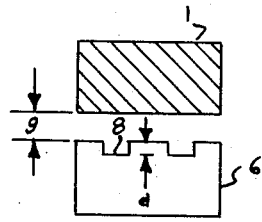
FIG. 5 is a sectional view taken at 5—5 of FIG. 4.

FIG. 5 is a cross section of the runner 6 showing the presence of grooves 8. The ratio of the groove depth d, greatly exaggerated, to the gap width g is preferably in the neighborhood of 500:1. For instance, a typical gap width in a seal of the type used in submersible motors is approximately 40 millionths of an inch. The depth of the grooves found to be suitable in such a seal is .020 inches, a groove depth-to-gap ratio of 500:1. It has been found, however, that a groove depth-to-gap ratio of 100:1 will be sufficient for some applications. Still deeper grooves may be provided, however, and still perform satisfactorily.

While the hydrostatic pressure provided by the pumping action of the grooves is undeniably related to some extent to both fluid viscosity and to the force which impels the ring and runner surfaces together, the force which is required to overcome the hydrostatic pressure generated by the deep grooves is significantly smaller than that which is necessary to overcome the pressure generated by prior art, "shallow," grooves. It has been calculated that a grooved runner having an outside diameter of 3 and 1/8 inches and an inside diameter of 2 and 1/4 inches, and having typical "shallow" grooves of a depth of 0.0001 inches, requires 1900 pounds of force per unit of fluid viscosity to maintain a small gap of $50 \times 10^{-6}$ inches. However, in a seal of comparable dimensions provided with "deep" grooves of 0.008 inches depth, only 4 pounds of force per unit viscosity is required. For this same gap oil will escape from the "shallow" grooved seal at a rate of 4150 gallons per year, as opposed to an outflow rate of 9.2 gallons per year for the "deep" grooved seal. Nonetheless, in tests the deep-grooved seal still provided sufficient hydrostatic pressure to virtually eliminate the inpumping phenomenon despite substantial eccentricity of the ring.

It is thus seen that by using the deep grooves as taught herein, fluid pressure in the gap between mating surfaces can be increased without causing a detrimental separation of the surfaces and the resulting outpumping. When sufficient pressure is applied to the seal surfaces to overcome the hydrostatic load-carrying capacity of the deep grooves, no measurable separation of the surfaces will occur although an increase in pressure of the fluid in the gap between the surfaces is experienced.

Load carrying capacity may be defined in this context as that capacity at which the surfaces are left with only a thin film between them, with separation between the surfaces virtually ceasing. It will be recognized by those skilled in the art that at the current stage of the relevant technology, even the best seal surfaces are neither perfectly flat nor perfectly parallel. For this reason, load carrying capacity is considered to be reached when points upon one surface, due to non-parallelism or surface irregularities, begin to touch points upon the opposite surface.

It will now be seen that the seal taught by the present invention, embodying deep grooves, provides advantages not herebefore known. While it is difficult to dimensionally define a deep groove as it is characterized in the present invention, due to the many variable factors involved, a deep groove as meant herein may be thought of as that groove having a depth greater than that required to sustain a force between moving surfaces, at a finite gap.

While there has been shown and described the presently preferred embodiment of this invention, it will of course be understood that various changes may be made in structural details and specific dimensions

What is claimed as new and desired to be secured by Letters Patent of the United States is:

1. Rotating seal means for inhibiting leakage of a first fluid disposed on one side of said seal means into a second fluid disposed on the opposite side of said seal means without excessive outpumping of said second fluid, said seal means comprising:
   a first annular element having a first planar surface, said first planar surface being provided with a plurality of generally helically-disposed viscosity grooves, said viscosity grooves extending from a common periphery of said annular element and terminating at a generally circular locus upon said first planar surface;
   a second annular element having a second planar surface adapted to mate with said first planar surface, said second annular element being adapted to rotate with respect to said first annular element;
   means for biasing said first and said second planar surfaces together, said biasing means providing a force of a magnitude to produce a thin film of said second fluid between said annular elements during mutual rotation of said seal elements, said film having a thickness such that points on the surface of one annular element begin to touch points on the second annular element.
   said viscosity grooves in said first annular element being further characterized by a depth at least 100 fold the thickness of the film in the gap between said surfaces when said surfaces are mutually rotated in a viscous fluid.

2. A shaft seal for inhibiting inpumping of ambient fluid into a machine housing containing sealing fluid, said seal comprising:
   a ring member attached to a shaft and rotating therewith;
   an annular stationary member disposed adjacent said shaft in juxtaposition with said ring member;
   means for biasing said ring member and said stationary member toward mutual contact;
   at least one said member having a series of viscosity grooves therein, said grooves contacting said sealing fluid within said machine and terminating between the inner and outer radial peripheries of said member, said sealing fluid being pumped between said juxtaposed members during rotation of one said member to form a thin film of sealing fluid between said members, said grooves having a depth greater than that depth which is required to sustain said bias with a thin film gap between said ring and said stationary member, said grooves further being characterized by a depth between 0.004 and 0.020 inches.

3. A shaft seal as defined in claim 2 wherein said the ratio between the depth of said groove and the gap between said ring and said stationary members is at least 100:1.

4. A shaft seal as defined in claim 1 wherein the ratio between the depth of said grooves and the gap between said ring and said stationary members is substantially 500:1.

5. A shaft seal for inhibiting inpumping of ambient fluid into a machine containing sealing fluid, said seal comprising:
   a rotatable ring member attached to a shaft and rotating therewith;
   an annular stationary member disposed about said shaft for mating with said ring member;
   means biasing said ring member and stationary member toward mutual contact;
   the mating face of one said member having a series of viscosity grooves therein, said grooves extending to one periphery of said member and terminating in the face of said member, said grooves having a depth greater than the minimum depth necessary to provide a thin sealing fluid film between said ring and said runner members;
   said grooves being further characterized by a depth greater than .004 inches.

6. A shaft seal as defined in claim 5 wherein the ratio between groove depth and the gap between said ring and said stationary members is at least 100:1.

7. A shaft seal as defined in claim 5 wherein the ratio between groove depth and the gap between said ring and said stationary members is substantially 500:1.

8. In a submersible motor, a shaft seal for preventing an inflow of pumped fluid and an outflow of dielectric fluid, said seal comprising:
   sealing ring means slidably attached to a shaft and rotatable therewith, and having a face for mating with a stationary runner means;
   stationary runner means disposed about said shaft and having a mating face adapted to bear against the mating face of said sealing ring means;
   means biasing said ring and said runner means toward mutual contact, said biasing means providing a force of a magnitude to produce a thin film of dielectric fluid between said mating faces to form a finite gap between 40 and 50 millionths of an inch thick between the mating faces;
   one of said mating faces having therein a series of viscosity grooves extending from one periphery thereof in communication with said dielectric fluid and terminating in said mating face, said grooves having a depth of at least 0.004 inches, said groove depth being manifold greater than the minimum depth required to sustain said biasing force at said finite gap, the pressure produced by said deep viscosity grooves being substantially less than the pressure generated by said minimum depth grooves thereby reducing the outpumping rate of dielectric from said seal.

* * * * *